(12) United States Patent
Thomas et al.

(10) Patent No.: US 12,112,750 B2
(45) Date of Patent: Oct. 8, 2024

(54) ACOUSTIC ZONING WITH DISTRIBUTED MICROPHONES

(71) Applicant: Dolby Laboratories Licensing Corporation, San Francisco, CA (US)

(72) Inventors: Mark R. P. Thomas, Walnut Creek, CA (US); Richard J. Cartwright, Killara (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 318 days.

(21) Appl. No.: 17/630,895

(22) PCT Filed: Jul. 28, 2020

(86) PCT No.: PCT/US2020/043886
§ 371 (c)(1),
(2) Date: Jan. 27, 2022

(87) PCT Pub. No.: WO2021/021814
PCT Pub. Date: Feb. 4, 2021

(65) Prior Publication Data
US 2022/0335937 A1 Oct. 20, 2022

Related U.S. Application Data

(60) Provisional application No. 62/950,004, filed on Dec. 18, 2019, provisional application No. 62/880,113, filed on Jul. 30, 2019.

(30) Foreign Application Priority Data

Nov. 29, 2019 (EP) ...................................... 19212391

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/08* (2013.01);
(Continued)

(58) Field of Classification Search
CPC ..... G10L 15/22; G10L 15/08; G10L 21/0264; G10L 2015/223; G10L 2015/088;
(Continued)

(56) References Cited

U.S. PATENT DOCUMENTS

| 9,008,686 | B2 | 4/2015 | Hannuksela |
| 9,432,768 | B1 | 8/2016 | Cornelius |
| 9,743,204 | B1 | 8/2017 | Welch |
| 9,972,339 | B1 | 5/2018 | Sundaram |
| 10,121,494 | B1 | 11/2018 | Sundaram |

(Continued)

*Primary Examiner* — Yosef K Laekemariam

(57) ABSTRACT

A method for estimating a user's location in an environment may involve receiving output signals from each microphone of a plurality of microphones in the environment. At least two microphones of the plurality of microphones may be included in separate devices at separate locations in the environment and the output signals may correspond to a current utterance of a user. The method may involve determining multiple current acoustic features from the output signals of each microphone and applying a classifier to the multiple current acoustic features. Applying the classifier may involve applying a model trained on previously-determined acoustic features derived from a plurality of previous utterances made by the user in a plurality of user zones in the environment. The method may involve determining, based at least in part on output from the classifier, an estimate of the user zone in which the user is currently located.

20 Claims, 8 Drawing Sheets

(51) Int. Cl.
*G10L 15/08* (2006.01)
*G10L 21/0264* (2013.01)
*H04R 1/40* (2006.01)
*H04R 3/00* (2006.01)
*H04S 7/00* (2006.01)

(52) U.S. Cl.
CPC .......... *G10L 21/0264* (2013.01); *H04R 1/406* (2013.01); *H04R 3/005* (2013.01); *H04S 7/303* (2013.01); *G10L 2015/223* (2013.01); *H04R 2430/21* (2013.01)

(58) Field of Classification Search
CPC ....... G10L 21/0216; G10L 2021/02166; G06F 3/167; H04R 1/406; H04R 3/00; H04R 1/40; H04R 1/028; H04R 3/12; H04R 27/00; H04R 2201/405; H04R 2227/005; H04R 3/005; H04R 2430/21; H04S 7/303
See application file for complete search history.

(56) References Cited

U.S. PATENT DOCUMENTS

| | | |
|---|---|---|
| 10,147,439 B1 | 12/2018 | Kristjansson |
| 10,192,546 B1 | 1/2019 | Piersol |
| 10,299,278 B1 | 5/2019 | Jorgovanovic |
| 10,304,475 B1 | 5/2019 | Wang |
| 2006/0029368 A1 | 2/2006 | Harville |
| 2014/0039888 A1* | 2/2014 | Taubman ................ G10L 15/30 |
| | | 704/235 |
| 2016/0039356 A1* | 2/2016 | Talwar .................... H04R 3/00 |
| | | 381/86 |
| 2017/0236512 A1 | 8/2017 | Williams |
| 2017/0270919 A1 | 9/2017 | Parthasarathi |
| 2018/0033428 A1 | 2/2018 | Kim et al. |
| 2018/0061404 A1 | 3/2018 | Devaraj |
| 2018/0108351 A1 | 4/2018 | Beckhardt |
| 2018/0197534 A1 | 7/2018 | Li |
| 2019/0156818 A1 | 5/2019 | Piersol |

* cited by examiner

ACOUSTIC ZONING WITH DISTRIBUTED MICROPHONES

CROSS-REFERENCE TO RELATED APPLICATION(S)

This application claims priority of U.S. Provisional Patent Application No. 62/950,004, filed Dec. 18, 2019, U.S. Provisional Patent Application No. 62/880,113, filed Jul. 30, 2019, and EP Patent Application No. 19212391.7, filed Nov. 29, 2019, all of which are hereby incorporated by reference in their entireties.

TECHNICAL FIELD

This disclosure pertains to systems and methods for coordinating and implementing smart audio devices.

BACKGROUND

Smart audio devices have been widely deployed and are becoming common features of many homes. Although existing systems and methods for implementing smart audio devices provide benefits, improved systems and methods would be desirable.

NOTATION AND NOMENCLATURE

Herein, we use the expression "smart audio device" to denote a smart device which is either a single purpose audio device or a virtual assistant (e.g., a connected virtual assistant). A single purpose audio device is a device (e.g., a television (TV) or a mobile phone) including or coupled to at least one microphone (and optionally also including or coupled to at least one speaker) and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user configured area.

Herein, a "virtual assistant" (e.g., a connected virtual assistant) is a device (e.g., a smart speaker, a smart display or a voice assistant integrated device) including or coupled to at least one microphone (and optionally also including or coupled to at least one speaker) and which may provide an ability to utilize multiple devices (distinct from the virtual assistant) for applications that are in a sense cloud enabled or otherwise not implemented in or on the virtual assistant itself. Virtual assistants may sometimes work together, e.g., in a very discrete and conditionally defined way. For example, two or more virtual assistants may work together in the sense that one of them, i.e., the one which is most confident that it has heard a wakeword, responds to the word. Connected devices may form a sort of constellation, which may be managed by one main application which may be (or include or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed. The speaker feed may, in some instances, undergo different processing in different circuitry branches coupled to the different transducers.

Herein, the expression "microphone location" denotes a location of one or more microphones. In some examples, a single microphone location may correspond to an array of microphones that reside in a single audio device. For example, the microphone location may be a single location that corresponds to an entire audio device that includes one or more microphones. In some such examples, a microphone location may be a single location that corresponds to a centroid of a microphone array of a single audio device. However, in some instances a microphone location may be a location of a single microphone. In some such examples, an audio device may have only a single microphone.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

An orchestrated system that includes multiple smart audio devices may require some understanding of the location of a user in order to at least: (a) select a best microphone for voice pickup; and (b) emit audio from sensible locations. Existing techniques include selecting a single microphone with high wakeword confidence and acoustic source localization algorithms using multiple synchronous microphones to estimate the coordinates of the user relative to the devices. As used herein, microphones may be referred to as "synchronous" if the sounds detected by the microphones are digitally sampled using the same sample clock, or synchronized sample clocks. For example, a first microphone of a plurality of microphones within the environment may sample audio data according to a first sample clock and a second microphone of the plurality of microphones may sample audio data according to the first sample clock.

Some embodiments contemplate a system of coordinated (orchestrated) smart audio devices, in which each of the smart audio devices is (or includes) a wakeword detector. Multiple microphones (e.g., asynchronous microphones) may be available, with each of the microphones being included in or configured for communication with a device that is implementing a classifier, which in some examples may be one of the smart audio devices. (A classifier may also be referred to herein as a "zone classifier" or a "classifier model.") In other examples, the classifier may be implemented by another type of device (e.g., a smart device that is not configured to provide audio) that is configured for communication with the microphones. For example, at least some of the microphones may be discrete microphones (e.g., in household appliances) which are not included in any of the smart audio devices but which are configured for communication with a device that is implementing a classifier that is configured to estimate a user's zone according to multiple acoustic features derived from at least some of the microphones. In some such embodiments, the goal is not to estimate the user's exact geometric location but to form a robust estimate of a discrete zone (e.g., in the presence of heavy noise and residual echo). As used herein, the "geometric location" of an object or a user in an environment refers to a location based on a coordinate system, whether the coordinate system is with reference to GPS coordinates, with reference to the environment as a whole (e.g., according to a Cartesian or polar coordinate system having its origin somewhere within the environment) or with reference to a particular device within the environment (e.g., according to a Cartesian or polar coordinate system having the device as its origin), such as a smart audio device. According to some examples, the estimate of a user's location in an environment may be determined without reference to geometric locations of the plurality of microphones.

The user, smart audio devices, and microphones may be in an environment (e.g., the user's residence, or place of business) in which sound may propagate from the user to the microphones, and the environment may include predetermined user zones. For example, the environment may include one or more of the following user zones: a food preparation area; a dining area; an open area of a living space; a TV area (including a TV couch) of the living space; a bedroom that is separated from open living space areas; and so on. During operation of the system according to some examples, it may be assumed that if the user is within the environment, the user is physically located in or near one of the user zones at any time, and that the user zone in which the user is currently located may change from time to time.

The microphones may be "asynchronous." As used herein, microphones may be referred to as "asynchronous" if the sounds detected by the microphones are digitally sampled using distinct sample clocks. For example, a first microphone of a plurality of microphones within the environment may sample audio data according to a first sample clock and a second microphone of the plurality of microphones may sample audio data according to a second sample clock. In some instances, the microphones in an environment may be randomly located, or at least may be distributed within the environment in an irregular and/or asymmetric manner. In some examples, the user's zone may be estimated via a data-driven approach that involves a plurality of high-level acoustic features derived, at least partially, from at least one of the wakeword detectors. These acoustic features (which may include wakeword confidence and/or received level) may, in some implementations, consume very little bandwidth and may be transmitted asynchronously to a device implementing a classifier with very little network load. Data regarding the geometric locations of the microphones may or may not be provided to the classifier, depending on the particular implementation. As noted elsewhere herein, in some examples an estimate of a user's location in an environment may be determined without reference to geometric locations of the plurality of microphones.

Aspects of some embodiments pertain to implementing smart audio devices, and/or to coordinating smart audio devices.

In accordance with some embodiments, in a system, multiple smart audio devices respond (e.g., by emitting light signals) in coordinated fashion (e.g., to indicate a degree of attentiveness or availability) to determination by the system of a common operating point (or operating state). For example, the operating point may be a state of attentiveness, entered in response to a wakeword from a user, with all the devices having an estimate (e.g., with at least one degree of uncertainty) of the user's position, and in which the devices emit light of different colors depending on their estimated distances from the user.

Some disclosed methods involve estimating a user's location in an environment. Some such methods may involve receiving output signals from each microphone of a plurality of microphones in the environment. Each of the plurality of microphones may reside in a microphone location of the environment. In some examples, the output signals may correspond to a current utterance of a user.

In some examples, at least two microphones of the plurality of microphones are included in separate devices at separate locations in the environment.

Some such methods may involve determining multiple current acoustic features from the output signals of each microphone and applying a classifier to the multiple current acoustic features. Applying the classifier may involve applying a model trained on previously-determined acoustic features derived from a plurality of previous utterances made by the user in a plurality of user zones in the environment. Some such methods may involve determining, based at least in part on output from the classifier, an estimate of the user zone in which the user is currently located. The user zones may, for example, include a sink area, a food preparation area, a refrigerator area, a dining area, a couch area, a television area and/or a doorway area.

In some examples, a first microphone of the plurality of microphones may sample audio data according to a first sample clock and a second microphone of the plurality of microphones may sample audio data according to a second sample clock. In some examples, at least one of the microphones may be included in, or configured for communication with, a smart audio device. According to some examples, the plurality of user zones may involve a plurality of predetermined user zones.

According to some examples, the estimate may be determined without reference to geometric locations of the plurality of microphones. In some examples, the multiple current acoustic features may be determined asynchronously.

In some instances, the current utterance and/or the previous utterances may include wakeword utterances. In some examples, a user zone may be estimated as a class with maximum posterior probability.

According to some implementations, the model may be trained using training data that is labelled with user zones. In some instances, the classifier may involve applying a model trained using unlabelled training data that is not labelled with user zones. In some examples, applying the classifier may involve applying a Gaussian Mixture Model trained on one or more of normalized wakeword confidence, normalized mean received level, or maximum received level.

In some examples, training of the model may continue during a process of applying the classifier. For example, the training may be based on explicit feedback from the user, i.e. feedback that is provided by a user. Alternatively, or additionally, the training may be based on implicit feedback, i.e. feedback that is provided automatically, such as implicit feedback regarding the success (or lack thereof) of beamforming or microphone selection based on an estimated user zone. In some examples, the implicit feedback may include a determination that a user has terminated the response of a voice assistant abnormally. According to some implementations, the implicit feedback may include a command recognizer returning a low-confidence result. In some instances, the implicit feedback may include a second-pass retrospective wakeword detector returning low confidence that the wakeword was spoken.

According to some implementations, the method may involve selecting at least one speaker according to the estimated user zone and controlling the at least one speaker to provide sound to the estimated user zone. Alternatively, or additionally, the method may involve selecting at least one microphone according to the estimated user zone and providing signals output by the at least one microphone to a smart audio device.

Some disclosed training methods may involve prompting a user to make at least one training utterance in each of a plurality of locations within a first user zone of an environment. According to some examples, the training utterance may be a wakeword utterance. Some such methods may involve receiving first output signals from each of a plurality of microphones in the environment. Each of the plurality of microphones may reside in a microphone location of the environment. In some instances, the first output signals may correspond to instances of detected training utterances received from the first user zone.

Some such methods may involve determining first acoustic features from each of the first output signals and training a classifier model to make correlations between the first user zone and the first acoustic features. In some instances, the classifier model may be trained without reference to geometric locations of the plurality of microphones. In some instances, the first acoustic features may include normalized wakeword confidence, normalized mean received level or maximum received level.

Some such methods may involve prompting a user to make the training utterance in each of a plurality of locations within second through $K^{th}$ user zones of the environment. Some such methods may involve receiving second through $H^{th}$ output signals from each of a plurality of microphones in the environment. The second through $H^{th}$ output signals may correspond to instances of detected training utterances received from the second through $K^{th}$ user zones, respectively. Some such methods may involve determining second through $G^{th}$ acoustic features from each of the second through $H^{th}$ output signals and training the classifier model to make correlations between the second through $K^{th}$ user zones and the second through $G^{th}$ acoustic features, respectively.

In some instances, a first microphone of the plurality of microphones may sample audio data according to a first sample clock and a second microphone of the plurality of microphones may sample audio data according to a second sample clock.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform one or more of the disclosed methods, at least in part.

One innovative aspect of the subject matter described in this disclosure may be implemented in an apparatus. The apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for performing one or more of the disclosed methods, at least in part.

Aspects of the disclosure include a system configured (e.g., programmed) to perform any embodiment of a disclosed method or steps thereof, and one or more tangible, non-transitory, computer readable media that implement non-transitory storage of data (for example, a disc or other tangible storage medium) which stores code for performing (e.g., code executable to perform) any embodiment of a disclosed method or steps thereof. For example, embodiments of a disclosed system can be or include a programmable general purpose processor, digital signal processor, or microprocessor, programmed with software or firmware and/or otherwise configured to perform any of a variety of operations on data, including an embodiment of a disclosed method or steps thereof. Such a general purpose processor may be or include a computer system including an input device, a memory, and a processing subsystem that is programmed (and/or otherwise configured) to perform an embodiment of a disclosed method (or steps thereof) in response to data asserted thereto.

BRIEF DESCRIPTION OF THE DRAWINGS

Like reference numbers and designations in the various drawings indicate like elements.

DETAILED DESCRIPTION OF EMBODIMENTS

Many embodiments of the present disclosure are technologically possible. It will be apparent to those of ordinary skill in the art from the present disclosure how to implement them. Some embodiments of systems and methods are described herein.

An orchestrated system consisting of multiple smart audio devices may be configured to determine when a "wakeword" (defined above) from a user is detected. At least some devices of such a system may be configured to listen for a command from the user.

Figure 1A:
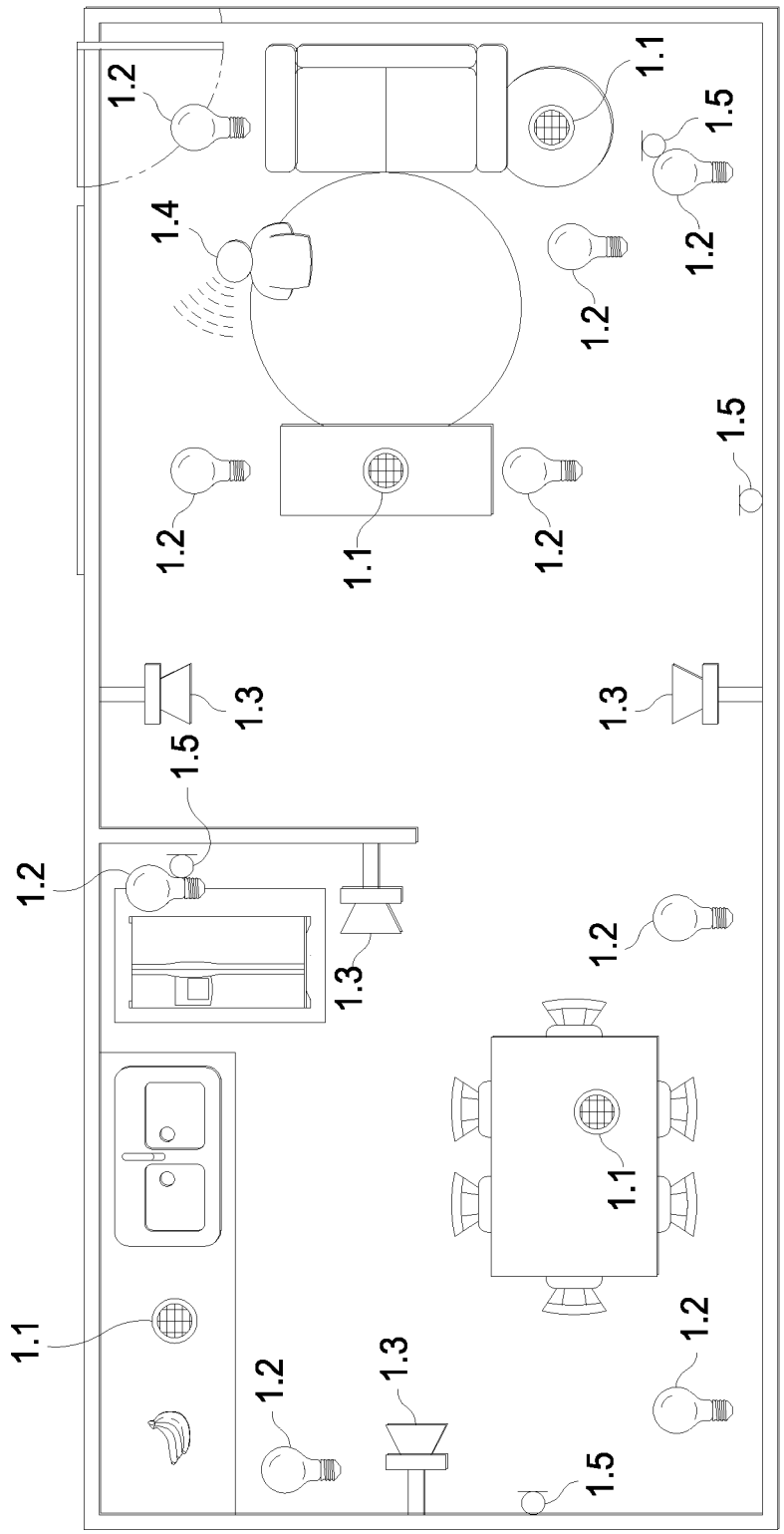
FIG. 1A represents an environment according to one example.
Figure 1B:
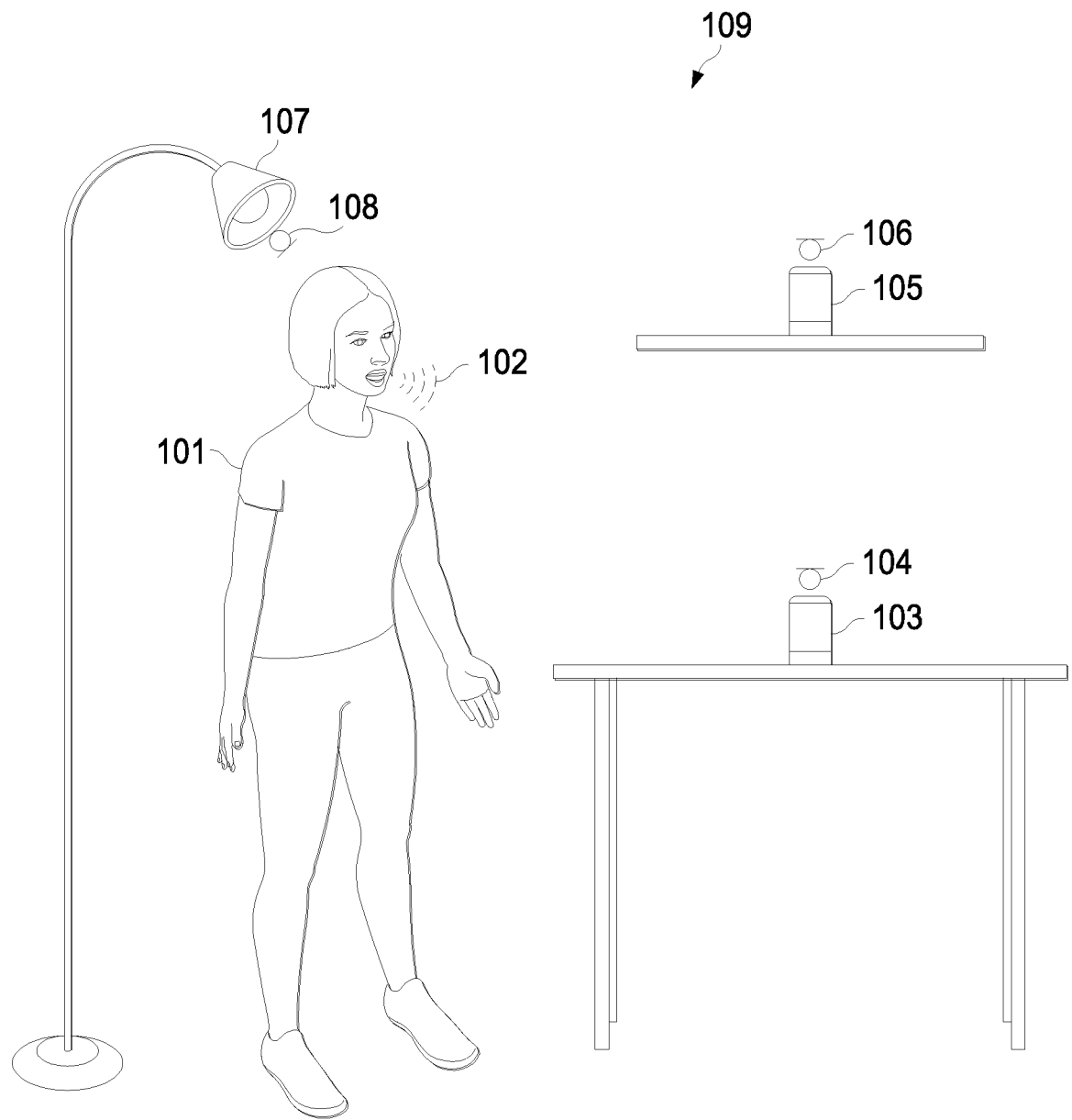
FIG. 1B represents an environment according to another example.
Figure 1C:
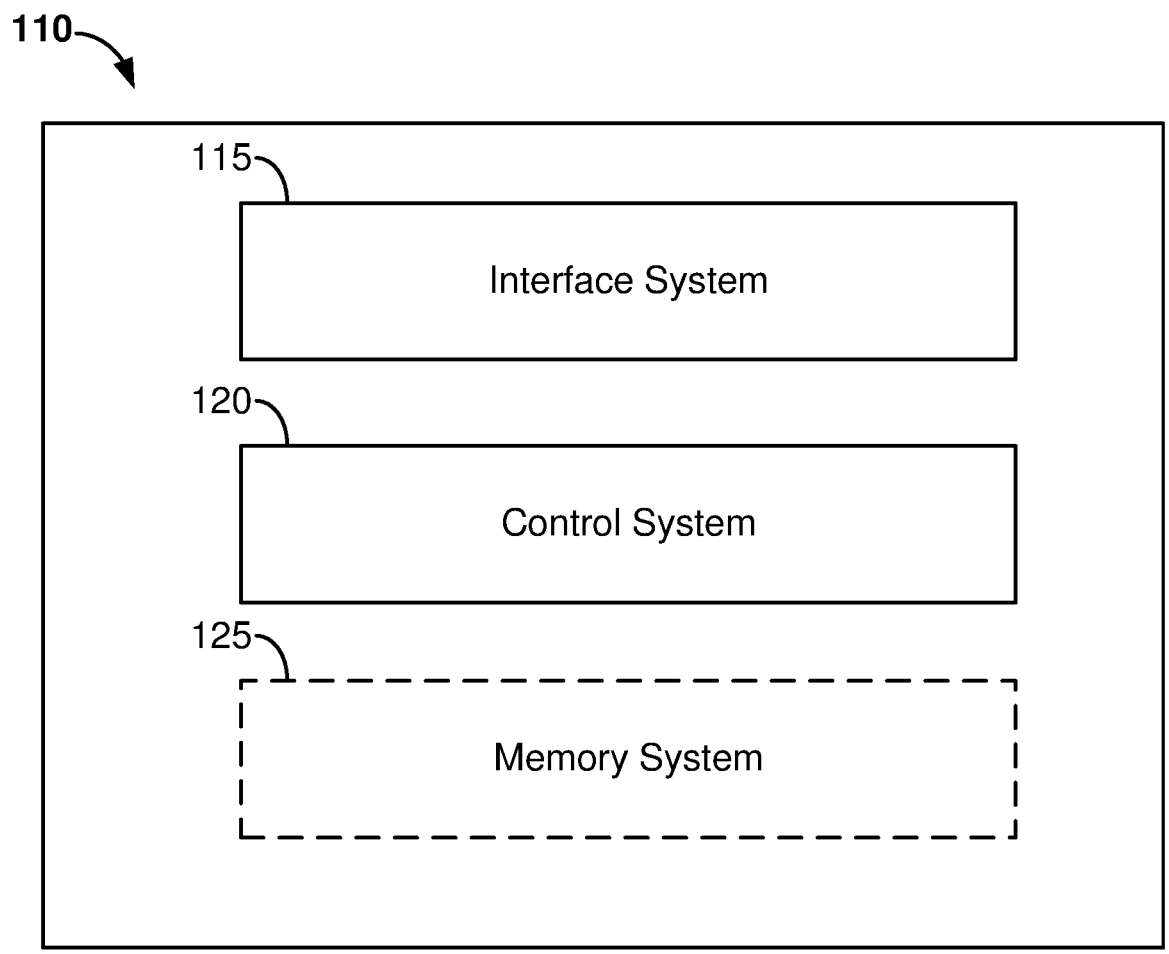
FIG. 1C is a block diagram that shows examples of components of an apparatus capable of implementing various aspects of this disclosure.
Figure 1D:
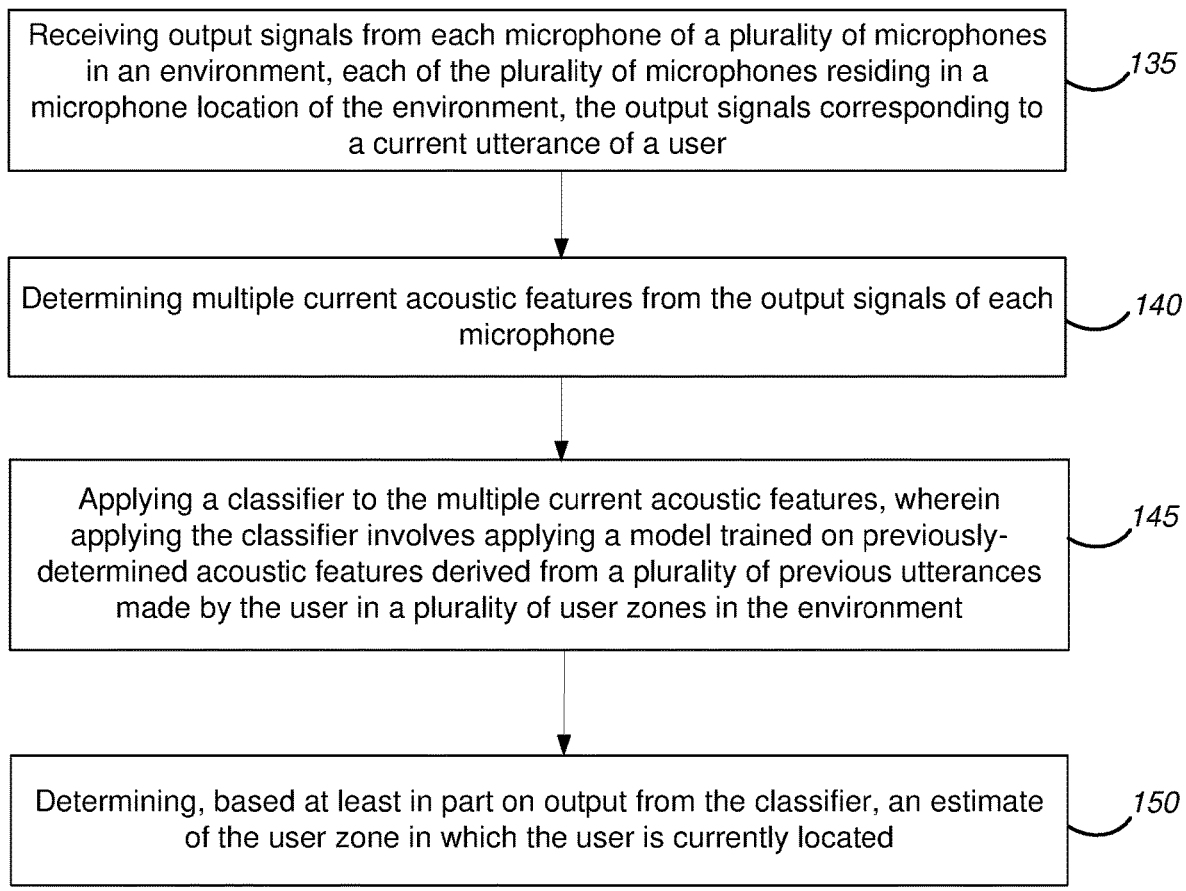
FIG. 1D is a flow diagram that outlines one example of a method that may be performed by an apparatus such as that shown in FIG. 1C.
Figure 2:
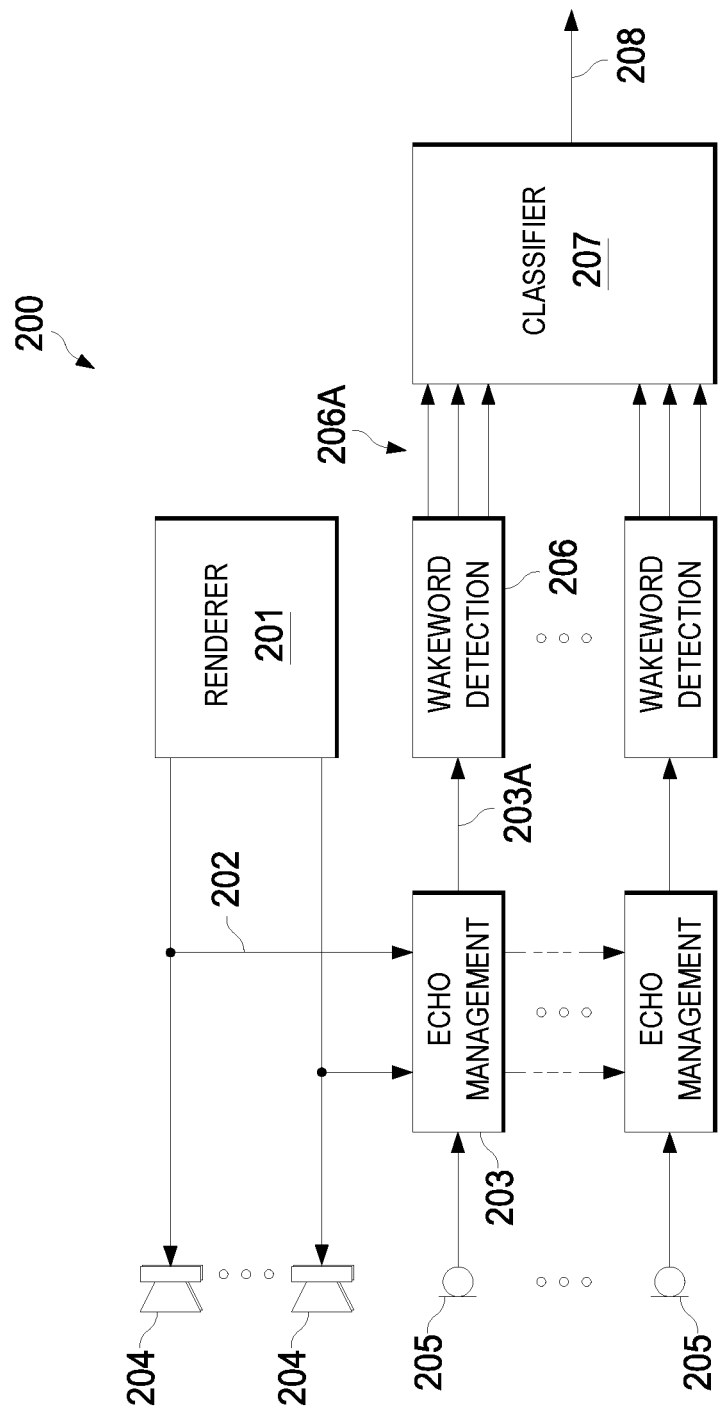
FIG. 2 is a block diagram of elements of one example of an embodiment that is configured to implement a zone classifier.
Figure 3:
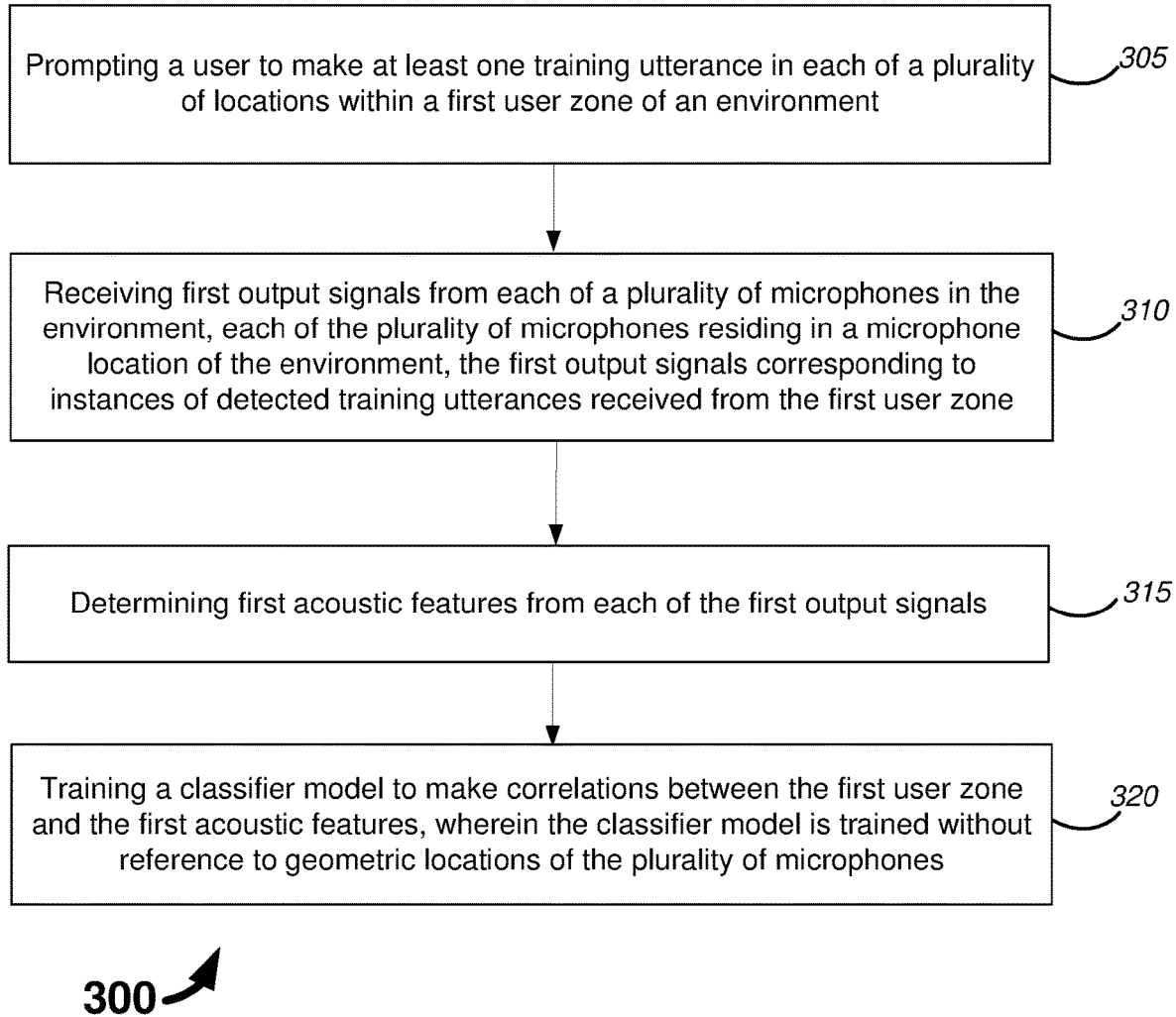
FIG. 3 is a flow diagram that outlines one example of a method that may be performed by an apparatus such as the apparatus of FIG. 1C.

Next, with reference to FIGS. 1-3, we describe some examples of embodiments of the present disclosure. FIG. 1A is a diagram of an environment (a living space) which includes a system including a set of smart audio devices (devices 1.1) for audio interaction, speakers (1.3) for audio output, microphones 1.5 and controllable lights (1.2). In some instances one or more of the microphones 1.5 may be part of, or associated with one of the devices 1.1, the lights 1.2 or the speakers 1.3. Alternatively, or additionally, one or more of the microphones 1.5 may be attached to another part of the environment, e.g., to a wall, to a ceiling, to furniture, to an appliance or to another device of the environment. In an example, each of the smart audio devices 1.1 includes (and/or is configured for communication with) at least one microphone 1.5. The system of FIG. 1A may be configured to implement an embodiment of the present disclosure. Using various methods, information may be obtained collectively from the microphones 1.5 of FIG. 1A and provided to a device implementing a classifier configured to provide a positional estimate of a user who speaks a wakeword.

In a living space (e.g., that of FIG. 1A), there are a set of natural activity zones where a person would be performing a task or activity, or crossing a threshold. These areas, which may be referred to herein as user zones, may be defined by a user, in some examples, without specifying coordinates or other indicia of a geometric location. In the example shown in FIG. 1A, user zones may include:
1. The kitchen sink and food preparation area (in the upper left region of the living space);
2. The refrigerator door (to the right of the sink and food preparation area);
3. The dining area (in the lower left region of the living space);
4. The open area of the living space (to the right of the sink and food preparation area and dining area);
5. The TV couch (at the right of the open area);
6. The TV itself;
7. Tables; and
8. The door area or entry way (in the upper right region of the living space).

In accordance with some embodiments, a system that estimates where a sound (e.g., a wakeword or other signal for attention) arises or originates may have some determined confidence in (or multiple hypotheses for) the estimate. E.g., if a user happens to be near a boundary between zones of the system's environment, an uncertain estimate of location of the user may include a determined confidence that the user is in each of the zones. In some conventional implementations of voice interface it is required that the voice assistant's voice is only issued from one location at a time, this forcing a single choice for the single location (e.g., one of the eight speaker locations, 1.1 and 1.3, in FIG. 1A). However, based on simple imaginary role play, it is apparent that (in such conventional implementations) the likelihood of the selected location of the source of the assistant's voice (e.g., the location of a speaker included in or configured for communication with the assistant) being the focus point or natural return response for expressing attention may be low.

Next, with reference to FIG. 1B, we describe another environment 109 (an acoustic space) which includes a user (101) who utters direct speech 102, and an example of a system including a set of smart audio devices (103 and 105), speakers for audio output, and microphones. The system may be configured in accordance with an embodiment of the present disclosure. The speech uttered by user 101 (sometimes referred to herein as a talker) may be recognized by element(s) of the system as a wakeword. More specifically, elements of the FIG. 1B system include:

102: direct local voice (produced by the user 101);

103: voice assistant device (coupled to one or more loudspeakers). Device 103 is positioned nearer to the user 101 than is device 105, and thus device 103 is sometimes referred to as a "near" device, and device 105 is referred to as a "distant" device;

104: plurality of microphones in (or coupled to) the near device 103;

105: voice assistant device (coupled to one or more loudspeakers);

106: plurality of microphones in (or coupled to) the distant device 105;

107: Household appliance (e.g. a lamp); and

108: Plurality of microphones in (or coupled to) household appliance 107. In some examples, each of the microphones 108 may be configured for communication with a device configured for implementing a classifier, which may in some instances be at least one of devices 103 or 105.

The FIG. 1B system may also include at least one classifier (e.g., classifier 207 of FIG. 2 described below). For example, device 103 (or device 105) may include a classifier. Alternatively, or additionally, the classifier may be implemented by another device that may be configured for communication with devices 103 and/or 105. In some examples, a classifier may be implemented by another local device (e.g., a device within the environment 109), whereas in other examples a classifier may be implemented by a remote device that is located outside of the environment 109 (e.g., a server).

FIG. 1C is a block diagram that shows examples of components of an apparatus capable of implementing various aspects of this disclosure. According to some examples, the apparatus 100 may be, or may include, a smart audio device that is configured for performing at least some of the methods disclosed herein. In other implementations, the apparatus 100 may be, or may include, another device that is configured for performing at least some of the methods disclosed herein. In some such implementations the apparatus 100 may be, or may include, a server.

In this example, the apparatus 110 includes an interface system 115 and a control system 120. The interface system 115 may, in some implementations, be configured for receiving input from each of a plurality of microphones in an environment. The interface system 115 may include one or more network interfaces and/or one or more external device interfaces (such as one or more universal serial bus (USB) interfaces). According to some implementations, the interface system 115 may include one or more wireless interfaces. The interface system 115 may include one or more devices for implementing a user interface, such as one or more microphones, one or more speakers, a display system, a touch sensor system and/or a gesture sensor system. In some examples, the interface system 115 may include one or more interfaces between the control system 120 and a memory system, such as the optional memory system 125 shown in FIG. 1C. However, the control system 120 may include a memory system.

The control system 120 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 120 may reside in more than one device. For example, a portion of the control system 120 may reside in a device within one of the environments depicted in FIGS. 1A and 1B, and another portion of the control system 120 may reside in a device that is outside the environment, such as a server, a mobile device (e.g., a smartphone or a tablet computer), etc. The interface system 115 also may, in some such examples, reside in more than one device.

In some implementations, the control system 120 may be configured for performing, at least in part, the methods disclosed herein. According to some examples, the control system 120 may be configured for implementing a classifier, e.g., such as those disclosed herein. In some such examples, the control system 120 may be configured for determining, based at least in part on output from the classifier, an estimate of a user zone in which a user is currently located.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 125 shown in FIG. 1C and/or in the control system 120. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 120 of FIG. 1C.

FIG. 1D is a flow diagram that outlines one example of a method that may be performed by an apparatus such as that shown in FIG. 1C. The blocks of method 130, like other methods described herein, are not necessarily performed in the order indicated. Moreover, such methods may include more or fewer blocks than shown and/or described. In this implementation, method 130 involves estimating a user's location in an environment.

In this example, block 135 involves receiving output signals from each microphone of a plurality of microphones in the environment. In this instance, each of the plurality of microphones resides in a microphone location of the environment. According to this example, the output signals correspond to a current utterance of a user. In some examples, the current utterance may be, or may include, a wakeword utterance. Block 135 may, for example, involve a control system (such as the control system 120 of FIG. 1C) receiving output signals from each microphone of a plurality of microphones in the environment via an interface system (such as the interface system 115 of FIG. 1C).

In some examples, at least some of the microphones in the environment may provide output signals that are asynchronous with respect to the output signals provided by one or more other microphones. For example, a first microphone of the plurality of microphones may sample audio data according to a first sample clock and a second microphone of the plurality of microphones may sample audio data according to a second sample clock. In some instances, at least one of the microphones in the environment may be included, in or configured for communication with, a smart audio device.

According to this example, block 140 involves determining multiple current acoustic features from the output signals of each microphone. In this example, the "current acoustic features" are acoustic features derived from the "current utterance" of block 135. In some implementations, block 140 may involve receiving the multiple current acoustic features from one or more other devices. For example, block 140 may involve receiving at least some of the multiple current acoustic features from one or more wakeword detectors implemented by one or more other devices. Alternatively, or additionally, in some implementations block 140 may involve determining the multiple current acoustic features from the output signals.

Whether the acoustic features are determined by a single device or multiple devices, the acoustic features may be determined asynchronously. If the acoustic features are determined by multiple devices, the acoustic features would generally be determined asynchronously unless the devices were configured to coordinate the process of determining acoustic features. If the acoustic features are determined by a single device, in some implementations the acoustic features may nonetheless be determined asynchronously because the single device may receive the output signals of each microphone at different times. In some examples, the acoustic features may be determined asynchronously because at least some of the microphones in the environment may provide output signals that are asynchronous with respect to the output signals provided by one or more other microphones.

In some examples, the acoustic features may include a wakeword confidence metric, a wakeword duration metric and/or at least one received level metric. The received level metric may indicate a received level of a sound detected by a microphone and may correspond to a level of a microphone's output signal.

Alternatively, or additionally, the acoustic features may include one or more of the following:

- Mean state entropy (purity) for each wakeword state along the 1-best (Viterbi) alignment with the acoustic model.
- CTC-loss (Connectionist Temporal Classification Loss) against the acoustic models of the wakeword detectors.
- A wakeword detector may be trained to provide an estimate of distance of the talker from the microphone and/or an reverberation time RT60 estimate in addition to the wakeword confidence. The distance estimate and/or the RT60 estimate may be acoustic features.
- Instead of, or in addition to, broadband received level/power at a microphone, an acoustic feature may be the received level in a number of log/Mel/Bark-spaced frequency bands. The frequency bands may vary according to the particular implementation (e.g., 2 frequency bands, 5 frequency bands, 20 frequency bands, 50 frequency bands, 1 octave frequency bands or ⅓ octave frequency bands).
- Cepstral representation of the spectral information in the preceding point, computed by taking the DCT (discrete cosine transform) of the logarithm of the band powers.
- Band powers in frequency bands weighted for human speech. For example, acoustic features may be based upon only a particular frequency band (for example, 400 Hz-1.5 kHz). Higher and lower frequencies may, in this example, be disregarded.
- Per-band or per-bin voice activity detector confidence.
- Acoustic features may be based, at least in part, on a long-term noise estimate so as to ignore microphones that have a poor signal-to-noise ratio.
- Kurtosis as a measure of speech peakiness. Kurtosis can be an indicator of smearing by a long reverberation tail.
- Estimated wakeword onset times. Like duration, one would expect onset and duration to be equal within a frame or so across all microphones. An outlier can give a clue of an unreliable estimate. This assumes some level of synchrony—not to the sample—but to the frame of a few tens of milliseconds, which may be reasonable.

According to this example, block 145 involves applying a classifier to the multiple current acoustic features. In some such examples, applying the classifier may involve applying a model trained on previously-determined acoustic features derived from a plurality of previous utterances made by the user in a plurality of user zones in the environment. Various examples are provided herein.

In some examples, the user zones may include a sink area, a food preparation area, a refrigerator area, a dining area, a couch area, a television area, a bedroom area and/or a doorway area. According to some examples, one or more of the user zones may be a predetermined user zone. In some such examples, one or more predetermined user zones may have been selectable by a user during a training process.

In some implementations, applying the classifier may involve applying a Gaussian Mixture Model trained on the previous utterances. According to some such implementations, applying the classifier may involve applying a Gaussian Mixture Model trained on one or more of normalized wakeword confidence, normalized mean received level, or maximum received level of the previous utterances. However, in alternative implementations applying the classifier may be based on a different model, such as one of the other models disclosed herein. In some instances, the model may be trained using training data that is labelled with user zones. However, in some examples applying the classifier involves applying a model trained using unlabelled training data that is not labelled with user zones.

In some examples, the previous utterances may have been, or may have included, wakeword utterances. According to some such examples, the previous utterances and the current utterance may have been utterances of the same wakeword.

In this example, block 150 involves determining, based at least in part on output from the classifier, an estimate of the user zone in which the user is currently located. In some such examples, the estimate may be determined without reference to geometric locations of the plurality of microphones. For example, the estimate may be determined without reference to the coordinates of individual microphones. In some examples, the estimate may be determined without estimating a geometric location of the user.

Some implementations of the method 130 may involve selecting at least one speaker according to the estimated user zone. Some such implementations may involve controlling at least one selected speaker to provide sound to the estimated user zone. Alternatively, or additionally, some implementations of the method 130 may involve selecting at least one microphone according to the estimated user zone. Some such implementations may involve providing signals output by at least one selected microphone to a smart audio device.

With reference to FIG. 2, we next describe an embodiment of the disclosure. FIG. 2 is a block diagram of elements of one example of an embodiment that is configured to implement a zone classifier. According to this example, system 200 includes a plurality of loudspeakers 204 distributed in at least a portion of an environment (e.g., an environment such as that illustrated in FIG. 1A or FIG. 1B). In this example, the system 200 includes a multichannel loudspeaker renderer 201. According to this implementation, the outputs of the multichannel loudspeaker renderer 201 serve as both loudspeaker driving signals (speaker feeds for driving speakers 204) and echo references. In this implementation, the echo references are provided to echo management subsystems 203 via a plurality of loudspeaker reference channels 202, which include at least some of the speaker feed signals output from renderer 202.

In this implementation, the system 200 includes a plurality of echo management subsystems 203. According to this example, the echo management subsystems 203 are configured to implement one or more echo suppression processes and/or one or more echo cancellation processes. In this example, each of the echo management subsystems 203 provides a corresponding echo management output 203A to one of the wakeword detectors 206. The echo management output 203A has attenuated echo relative to the input to the relevant one of the echo management subsystems 203.

According to this implementation, the system 200 includes N microphones 205 (N being an integer) distributed in at least a portion of the environment (e.g., the environment illustrated in FIG. 1A or FIG. 1B). The microphones may include array microphones and/or spot microphones. For example, one or more smart audio devices located in the environment may include an array of microphones. In this example, the outputs of microphones 205 are provided as input to the echo management subsystems 203. According to this implementation, each of echo management subsystems 203 captures the output of an individual microphone 205 or an individual group or subset of the microphones 2059.

In this example, the system 200 includes a plurality of wakeword detectors 206. According to this example, each of the wakeword detectors 206 receives the audio output from one of the echo management subsystems 203 and outputs a plurality of acoustic features 206A. The acoustic features 206A output from each echo management subsystem 203 may include (but are not limited to): wakeword confidence, wakeword duration and measures of received level. Although three arrows, depicting three acoustic features 206A, are shown as being output from each echo management subsystem 203, more or fewer acoustic features 206A may be output in alternative implementations. Moreover, although these three arrows are impinging on the classifier 207 along a more or less vertical line, this does not indicate that the classifier 207 necessarily receives the acoustic features 206A from all of the wakeword detectors 206 at the same time. As noted elsewhere herein, the acoustic features 206A may, in some instances, be determined and/or provided to the classifier asynchronously.

According to this implementation, the system 200 includes a zone classifier 207, which may also be referred to as a classifier 207. In this example, the classifier receives the plurality of features 206A from the plurality of wakeword detectors 206 for a plurality of (e.g., all of) the microphones 205 in the environment. According to this example, the output 208 of the zone classifier 207 corresponds to an an estimate of the user zone in which the user is currently located. According to some such examples, the output 208 may correspond to one or more posterior probabilities. An estimate of the user zone in which the user is currently located may be, or may correspond to, a maximum a posteriori probability according to Bayesian statistics.

We next describe example implementations of a classifier, which may in some examples correspond with the zone classifier 207 of FIG. 2. Let $x_i(n)$ be the ith microphone signal, $i=\{1 \ldots N\}$, at discrete time n (i.e., the microphone signals $x_i(n)$ are the outputs of the N microphones 205). Processing of the N signals $x_i(n)$ in echo management subsystems 203 generates 'clean' microphone signals $e_i(n)$, where $i=\{1 \ldots N\}$, each at a discrete time n. Clean signals $e_i(n)$, referred to as 203A in FIG. 2, are fed to wakeword detectors 206 in this example. Here, each wakeword detector 206 produces a vector of features $w_i(j)$, referred to as 206A in FIG. 2, where $j=\{1 \ldots J\}$ is an index corresponding to the jth wakeword utterance. In this example, the classifier 207 takes as input an aggregate feature set $W(j)=[w_1^T(j) \ldots w_N^T(j)]^T$.

According to some implementations, a set of zone labels $C_k$, for $k=\{1 \ldots K\}$, may correspond to a number, K, of different user zones in an environment. For example, the user zones may include a couch zone, a kitchen zone, a reading chair zone, etc. Some examples may define more than one zone within a kitchen or other room. For example, a kitchen area may include a sink zone, a food preparation zone, a refrigerator zone and a dining zone. Similarly, a living room area may include a couch zone, a television zone, a reading chair zone, one or more doorway zones, etc. The zone labels for these zones may be selectable by a user, e.g., during a training phase.

In some implementations, classifier 207 estimates posterior probabilities $p(C_k|W(j))$ of the feature set $W(j)$, for example by using a Bayesian classifier. Probabilities $p(C_k|W(j))$ indicate a probability (for the "j"th utterance and the "k"th zone, for each of the zones $C_k$, and each of the utterances) that the user is in each of the zones $C_k$, and are an example of output 208 of classifier 207.

According to some examples, training data may be gathered (e.g., for each user zone) by prompting a user to select or define a zone, e.g., a couch zone. The training process may involve prompting the user make a training utterance, such as a wakeword, in the vicinity of a selected or defined zone. In a couch zone example, the training process may involve prompting the user to make the training utterance at the center and extreme edges of a couch. The training process may involve prompting the user to repeat the training utterance several times at each location within the user zone. The user may then be prompted to move to another user zone and to continue until all designated user zones have been covered.

FIG. 3 is a flow diagram that outlines one example of a method that may be performed by an apparatus such as apparatus 110 of FIG. 1C. The blocks of method 300, like other methods described herein, are not necessarily performed in the order indicated. Moreover, such methods may include more or fewer blocks than shown and/or described. In this implementation, method 300 involves training a classifier for estimating a user's location in an environment.

In this example, block 305 involves prompting a user to make at least one training utterance in each of a plurality of locations within a first user zone of an environment. The training utterance(s) may, in some examples, be one or more instances of a wakeword utterance. According to some implementations, the first user zone may be any user zone selected and/or defined by a user. In some instances, a control system may create a corresponding zone label (e.g., a corresponding instance of one of the zone labels $C_k$ described above) and may associate the zone label with training data obtained for the first user zone.

An automated prompting system may be used to collect these training data. As noted above, the interface system 115 of apparatus 110 may include one or more devices for implementing a user interface, such as one or more microphones, one or more speakers, a display system, a touch sensor system and/or a gesture sensor system. For example, the apparatus 110 may provide the user with the following prompts on a screen of the display system or hear them announced via one or more speakers during the training process:

"Move to the couch."
"Say the wakeword ten times while moving your head about."
"Move to a position halfway between the couch and the reading chair and say the wakeword ten times."
"Stand in the kitchen as if cooking and say the wakeword ten times."

In this example, block 310 involves receiving first output signals from each of a plurality of microphones in the environment. In some examples, block 310 may involve receiving the first output signals from all of the active microphones in the environment, whereas in other examples block 310 may involve receiving the first output signals from a subset of all of the active microphones in the environment. In some examples, at least some of the microphones in the environment may provide output signals that are asynchronous with respect to the output signals provided by one or more other microphones. For example, a first microphone of the plurality of microphones may sample audio data according to a first sample clock and a second microphone of the plurality of microphones may sample audio data according to a second sample clock.

In this example, each microphone of the plurality of microphones resides in a microphone location of the environment. In this example, the first output signals correspond to instances of detected training utterances received from the first user zone. Because block 305 involves prompting the user to make at least one training utterance in each of a plurality of locations within the first user zone of an environment, in this example the term "first output signals" refers to a set of all output signals corresponding to training utterances for the first user zone. In other examples the term "first output signals" may refer to a subset of all output signals corresponding to training utterances for the first user zone.

According to this example, block 315 involves determining one or more first acoustic features from each of the first output signals. In some examples, the first acoustic features may include a wakeword confidence metric and/or a received level metric. For example, the first acoustic features may include a normalized wakeword confidence metric, an indication of normalized mean received level and/or an indication of maximum received level.

As noted above, because block 305 involves prompting the user to make at least one training utterance in each of a plurality of locations within the first user zone of an environment, in this example the term "first output signals" refers to a set of all output signals corresponding to training utterances for the first user zone. Accordingly, in this example the term "first acoustic features" refers to a set of acoustic features derived from the set of all output signals corresponding to training utterances for the first user zone. Therefore, in this example the set of first acoustic features is at least as large as the set of first output signals. If, for example, two acoustic features were determined from each of the output signals, the set of first acoustic features would be twice as large as the set of first output signals.

In this example, block 320 involves training a classifier model to make correlations between the first user zone and the first acoustic features. The classifier model may, for example, be any of those disclosed herein. According to this implementation, the classifier model is trained without reference to geometric locations of the plurality of microphones. In other words, in this example, data regarding geometric locations of the plurality of microphones (e.g., microphone coordinate data) is not provided to the classifier model during the training process.

Figure 4:
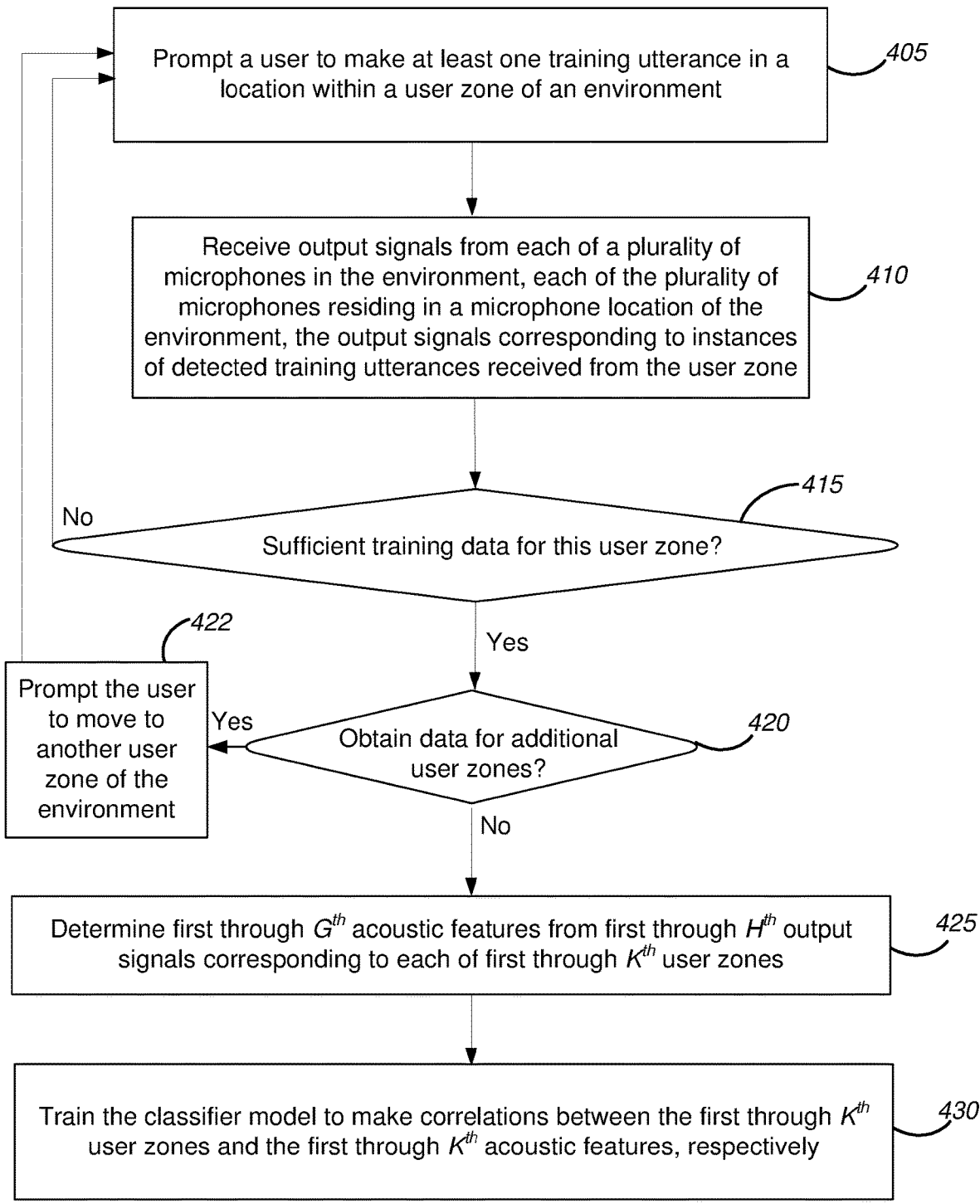
FIG. 4 is a flow diagram that outlines another example of a method that may be performed by an apparatus such as the apparatus of FIG. 1C.

FIG. 4 is a flow diagram that outlines another example of a method that may be performed by an apparatus such as apparatus 110 of FIG. 1C. The blocks of method 400, like other methods described herein, are not necessarily performed in the order indicated. For example, in some implementations at least a portion of the acoustic feature determination process of block 425 may be performed prior to block 415 or block 420. Moreover, such methods may include more or fewer blocks than shown and/or described. In this implementation, method 400 involves training a classifier for estimating a user's location in an environment. Method 400 provides an example of extending method 300 to multiple user zones of the environment.

In this example, block 405 involves prompting a user to make at least one training utterance in a location within a user zone of an environment. In some instances, block 405 may be performed in the manner described above with reference to block 305 of FIG. 3, except that block 405 pertains to a single location within a user zone. The training utterance(s) may, in some examples, be one or more instances of a wakeword utterance. According to some implementations, the user zone may be any user zone selected and/or defined by a user. In some instances, a control system may create a corresponding zone label (e.g., a corresponding instance of one of the zone labels $C_k$ described above) and may associate the zone label with training data obtained for the user zone.

According to this example, block 410 is performed substantially as described above with reference to block 310 of FIG. 3. However, in this example the process of block 410 is generalized to any user zone, not necessarily the first user zone for which training data are acquired. Accordingly, the output signals received in block 410 are "output signals from each of a plurality of microphones in the environment, each of the plurality of microphones residing in a microphone location of the environment, the output signals corresponding to instances of detected training utterances received from the user zone." In this example, the term "output signals" refers to a set of all output signals corresponding to one or more training utterances in a location of the user zone. In other examples the term "output signals" may refer to a subset of all output signals corresponding to one or more training utterances in a location of the user zone.

According to this example, block 415 involves determining whether sufficient training data have been acquired for the current user zone. In some such examples, block 415 may involve determining whether output signals corresponding to a threshold number of training utterances have been obtained for the current user zone. Alternatively, or additionally, block 415 may involve determining whether output signals corresponding to training utterances in a threshold number of locations within the current user zone have been obtained. If not, method 400 reverts to block 405 in this example and the user is prompted to make at least one additional utterance at a location within the same user zone.

However, if it is determined in block 415 that sufficient training data have been acquired for the current user zone, in this example the process continues to block 420. According to this example, block 420 involves determining whether to obtain training data for additional user zones. According to some examples, block 420 may involve determining whether training data have been obtained for each user zone that a user has previously identified. In other examples, block 420 may involve determining whether training data have been obtained for a minimum number of user zones. The minimum number may have been selected by a user. In other examples, the minimum number may be a recommended minimum number per environment, a recommended minimum number per room of the environment, etc.

If it is determined in block 420 that training data should be obtained for additional user zones, in this example the process continues to block 422, which involves prompting the user to move to another user zone of the environment. In some examples, the next user zone may be selectable by the user. According to this example, the process continues to block 405 after the prompt of block 422. In some such examples, the user may be prompted to confirm that the user has reached the new user zone after the prompt of block 422. According to some such examples, the user may be required to confirm that the user has reached the new user zone before the prompt of block 405 is provided.

If it is determined in block 420 that training data should not be obtained for additional user zones, in this example the process continues to block 425. In this example, method 400 involves obtaining training data for K user zones. In this implementation, block 425 involves determining first through $G^{th}$ acoustic features from first through $H^{th}$ output signals corresponding to each of the first through $K^{th}$ user zones for which training data has been obtained. In this example, the term "first output signals" refers to a set of all output signals corresponding to training utterances for a first user zone and the term "$H^{th}$ output signals" refers to a set of all output signals corresponding to training utterances for a $K^{th}$ user zone. Similarly, the term "first acoustic features" refers to a set of acoustic features determined from the first output signals and the term "$G^{th}$ acoustic features" refers to a set of acoustic features determined from the $H^{th}$ output signals.

According to these examples, block 430 involves training a classifier model to make correlations between the first through $K^{th}$ user zones and the first through $K^{th}$ acoustic features, respectively. The classifier model may, for example, be any of the classifier models disclosed herein.

In the foregoing example, the user zones are labeled (e.g., according to a corresponding instance of one of the zone labels $C_k$ described above). However, the model may either be trained according to labeled or unlabeled user zones, depending on the particular implementation. In the labeled case, each training utterance may be paired with a label corresponding to a user zone, e.g., as follows:

$$p(C_k | W(j)) = \begin{cases} 1 & k = k' \\ 0 & \text{otherwise} \end{cases},$$

Training the classifier model may involve determining a best fit for the labeled training data. Without loss of generality, appropriate classification approaches for a classifier model may include:
- A Bayes' Classifier, for example with per-class distributions described by multivariate normal distributions, full-covariance Gaussian Mixture Models or diagonal-covariance Gaussian Mixture Models;
- Vector Quantization;
- Nearest Neighbor (k-means);
- A Neural Network having a softmax output layer with one output corresponding to each class;
- A Support Vector Machine (SVM); and/or
- Boosting techniques, such as Gradient Boosting Machines (GBMs)

In one example of implementing the unlabeled case, data may be automatically split into K clusters, where K may also be unknown. The unlabeled automatic splitting can be performed, for example, by using a classical clustering technique, e.g., the k-means algorithm or Gaussian Mixture Modelling.

In order to improve robustness, regularization may be applied to the classifier model training and model parameters may be updated over time as new utterances are made. We next describe further aspects of an embodiment.

An example acoustic feature set (e.g., acoustic features 206A of FIG. 2) may include the likelihood of wakeword confidence, mean received level over the estimated duration of the most confident wakeword, and maximum received level over the duration of the most confident wakeword. Features may be normalized relative to their maximum values for each wakeword utterance. Training data may be labeled and a full covariance Gaussian Mixture Model (GMM) may be trained to maximize expectation of the training labels. The estimated zone may be the class that maximizes posterior probability.

The above description of some embodiments discusses learning an acoustic zone model from a set of training data collected during a prompted collection process. In that model, training time (or configuration mode) and run time (or regular mode) can be considered two distinct modes that the microphone system may be placed in. An extension to this scheme is online learning, in which some or all of the acoustic zone model is learnt or adapted online (i.e., at run time or in regular mode). In other words, even after the classifier is being applied in a "run time" process to make an estimate of a user zone in which the user is currently located (e.g., pursuant to method 130 of FIG. 1D), in some implementations the process of training the classifier may continue.

Figure 5:
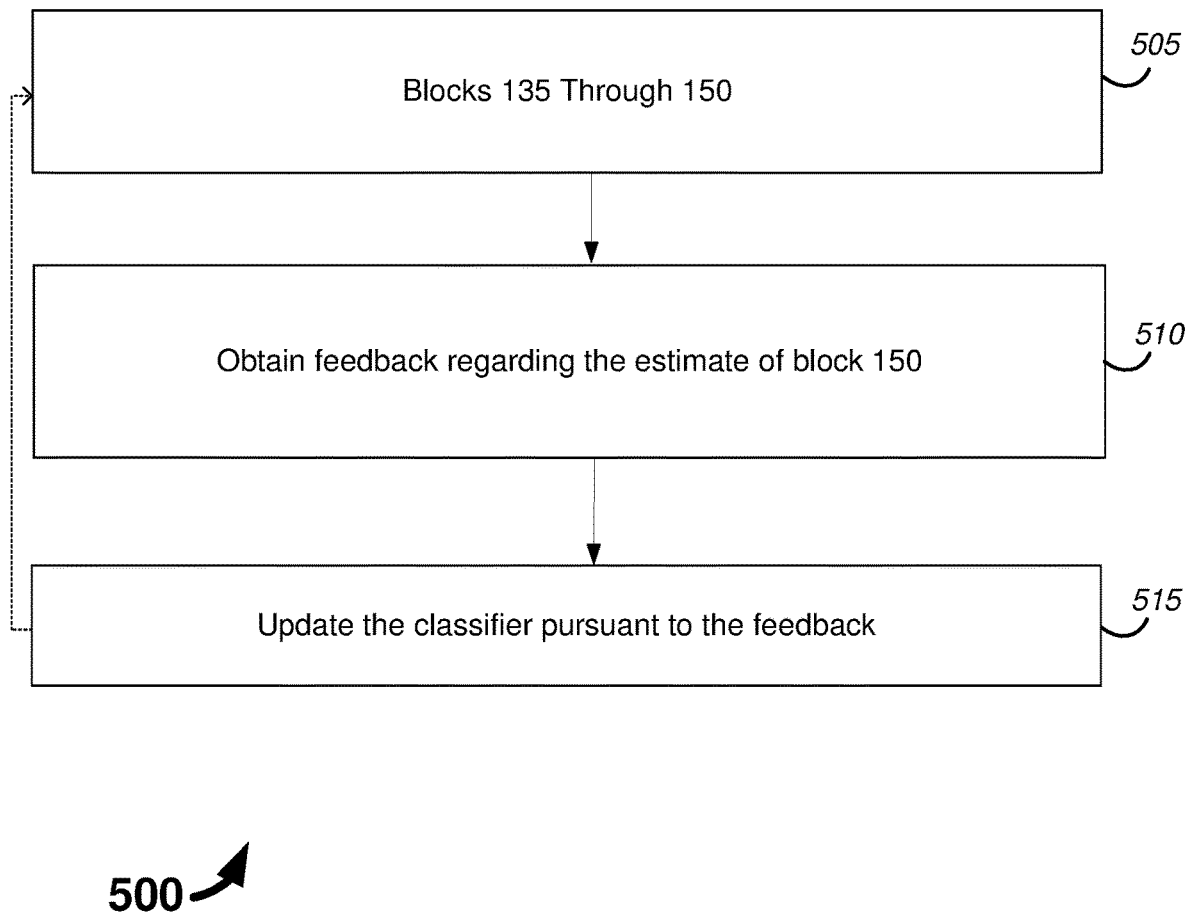
FIG. 5 is a flow diagram that outlines another example of a method that may be performed by an apparatus such as the apparatus of FIG. 1C.

FIG. 5 is a flow diagram that outlines another example of a method that may be performed by an apparatus such as apparatus 110 of FIG. 1C. The blocks of method 500, like other methods described herein, are not necessarily performed in the order indicated. Moreover, such methods may include more or fewer blocks than shown and/or described. In this implementation, method 500 involves ongoing training of a classifier during a "run time" process of estimating a user's location in an environment. Method 500 is an example of what is referred to herein as an online learning mode.

In this example, block 505 of method 500 corresponds to blocks 135-150 of method 130. Here, block 505 involves providing in an estimate, based at least in part on output from the classifier, of a user zone in which the user is currently located. According to this implementation, block 510 involves obtaining implicit or explicit feedback regarding the estimate of block 505. In block 515, the classifier is updated pursuant to the feedback received in block 505. Block 515 may, for example, involve one or more reinforcement learning methods. As suggested by the dashed arrow from block 515 to block 505, in some implementations method 500 may involve reverting to block 505. For example, method 500 may involve providing future estimates of a user zone in which the user is located at that future time, based on applying the updated model.

Explicit techniques for obtaining feedback may include:
- Asking the user whether the prediction was correct using a voice user interface (UI). For example, a sound indicative of the following may be provided to the user: "I think you are on the couch, please say 'right' or 'wrong'".
- Informing the user that incorrect predictions may be corrected at any time using the voice UI. (e.g., sound indicative of the following may be provided to the user: "I am now able to predict where you are when you speak to me. If I predict wrongly, just say something like 'Amanda, I'm not on the couch. I'm in the reading chair'").
- Informing the user that correct predictions may be rewarded at any time using the voice UI. (e.g., sound indicative of the following may be provided to the user: "I am now able to predict where you are when you speak to me. If I predict correctly you can help to further improve my predictions by saying something like 'Amanda, that's right. I am on the couch.'").
- Including physical buttons or other UI elements that a user can operate in order to give feedback (e.g., a thumbs up and/or thumbs down button on a physical device or in a smartphone app).

The goal of predicting the user zone in which the user is located may be to inform a microphone selection or adaptive beamforming scheme that attempts to pick up sound from the acoustic zone of the user more effectively, for example, in order to better recognize a command that follows the wakeword. In such scenarios, implicit techniques for obtaining feedback on the quality of zone prediction may include:
- Penalizing predictions that result in misrecognition of the command following the wakeword. A proxy that may indicate misrecognition may include the user cutting short the voice assistant's response to a command, for example, by utterance a counter-command like, for example, "Amanda, stop!";

Penalizing predictions that result in low confidence that a speech recognizer has successfully recognized a command. Many automatic speech recognition systems have the capability to return a confidence level with their result that can be used for this purpose;

Penalizing predictions that result in failure of a second-pass wakeword detector to retrospectively detect the wakeword with high confidence; and/or Reinforcing predictions that result in highly confident recognition of the wakeword and/or correct recognition of the user's command.

Following is an example of a failure of a second-pass wakeword detector to retrospectively detect the wakeword with high confidence. Suppose that after obtaining output signals corresponding to a current utterance from microphones in an environment and after determining acoustic features based on the output signals (e.g., via a plurality of first pass wakeword detectors configured for communication with the microphones), the acoustic features are provided to a classifier. In other words, the acoustic features are presumed to correspond to a detected wakeword utterance. Suppose further that the classifier determines that the person who made the current utterance is most likely to be in zone 3, which corresponds to a reading chair in this example. There may, for example, be a particular microphone or learned combination of microphones that is known to be best for listening to the person's voice when the person is in zone 3, e.g., to send to a cloud-based virtual assistant service for voice command recognition.

Suppose further that after determining which microphone(s) will be used for speech recognition, but before the person's speech is actually sent to the virtual assistant service, a second-pass wakeword detector operates on microphone signals corresponding to speech detected by the chosen microphone(s) for zone 3 that you are about to submit for command recognition. If that second pass wakeword detector disagrees with your plurality of first pass wakeword detectors that the wakeword was actually uttered it is probably because the classifier incorrectly predicted the zone. Therefore, the classifier should be penalized.

Techniques for the a posteriori updating of the zone mapping model after one or more wakewords have been spoken may include:

Maximum a posteriori (MAP) adaptation of a Gaussian Mixture Model (GMM) or nearest neighbor model; and/or Reinforcement learning, for example of a neural network, for example by associating an appropriate "one-hot" (in the case of correct prediction) or "one-cold" (in the case of incorrect prediction) ground truth label with the softmax output and applying online back propagation to determine new network weights.

Some examples of a MAP adaptation in this context may involve adjusting the means in the GMM each time a wakeword is spoken. In this manner, the means may become more like the acoustic features that are observed when subsequent wakewords are spoken. Alternatively, or additionally, such examples may involve adjusting the variance/covariance or mixture weight information in the GMM each time a wakeword is spoken.

For example, a MAP adaptation scheme may be as follows:

$$\mu_{i,new} = \mu_{i,old} * \alpha + x * (1-\alpha)$$

In the foregoing equation, $\mu_{i,old}$ represents the mean of the $i^{th}$ Gaussian in the mixture, $\alpha$ represents a parameter which controls how aggressively MAP adaptation should occur ($\alpha$ may be in the range [0.9,0.999]) and x represents the feature vector of the new wakeword utterance. The index "i" would correspond to the mixture element that returns the highest a priori probability of containing the speaker's location at wakeword time.

Alternatively, each of the mixture elements may be adjusted according to their a priori probability of containing the wakeword, e.g., as follows:

$$M_{i,new} = \mu_{i,old} * \beta_i * x * (1-\beta_i)$$

In the foregoing equation, $\beta_i = \alpha * (1-P(i))$, wherein P(i) represents the a priori probability that the observation x is due to mixture element i.

In one reinforcement learning example, there may be three user zones. Suppose that for a particular wakeword, the model predicts the probabilities as being [0.2, 0.1, 0.7] for the three user zones. If a second source of information (for example, a second-pass wakeword detector) confirms that the third zone was correct, then the ground truth label could be [0, 0, 1] ("one hot"). The a posteriori updating of the zone mapping model may involve back-propagating the error through a neural network, effectively meaning that the neural network will more strongly predict zone 3 if shown the same input again. Conversely, if the second source of information shows that zone 3 was an incorrect prediction, the ground truth label could be [0.5, 0.5, 0.0] in one example. Back-propagating the error through the neural network would make the model less likely to predict zone 3 if shown the same input in the future.

Aspects of some embodiments include one or more of the following:

Example 1. A method for estimating a user's location (e.g., as a zone label) in an environment, wherein the environment includes a plurality of user zones and a plurality of microphones (e.g., each of the microphones is included in or configured for communication with at least one smart audio device in the environment), said method including a step of: determining (e.g., at least in part from output signals of the microphones) an estimate of in which one of the user zones the user is located;

Example 2. The method of Example 1, wherein the microphones are asynchronous and/or randomly distributed;

Example 3. The method of Example 1, wherein determining the estimate involves applying a classifier model that has been trained on acoustic features derived from a plurality of wakeword detectors, the acoustic features being based on a plurality of wakeword utterances in a plurality of locations;

Example 4. The method of Example 3, wherein user zone is estimated as the class with maximum posterior probability;

Example 5. The method of Example 3, wherein the classifier model is trained using training data labeled with a reference zone;

Example 6. The method of Example 1, wherein the classifier model is trained using unlabeled training data;

Example 7. The method of Example 1, wherein the classifier model comprises a Gaussian Mixture Model that has been trained according to the normalized wakeword confidence, normalized mean received level, and maximum received level;

Example 8. The method of any of the previous Examples, wherein adaption of the acoustic zone model is performed online;

Example 9. The method of Example 8, wherein said adaptation is based on explicit feedback from the user;

Example 10. The method of Example 8, wherein said adaptation is based on implicit feedback to the success of beamforming or microphone selection based on the predicted acoustic zone;

Example 11. The method of Example 10, wherein said implicit feedback includes the user terminating the response of the voice assistant early;

Example 12. The method of Example 10, wherein said implicit feedback includes the command recognizer returning a low-confidence result; and Example 13. The method of Example 10, wherein said implicit feedback includes a second-pass retrospective wakeword detector returning low confidence that the wakeword was spoken.

Some embodiments include a system or device configured (e.g., programmed) to perform one or more disclosed methods, and a tangible computer readable medium (e.g., a disc) which stores code for implementing the one or more disclosed methods or steps thereof. For example, the system may be or may include a programmable general purpose processor, digital signal processor, or microprocessor, programmed with software or firmware and/or otherwise configured to perform any of a variety of operations on data, including an embodiment of a disclosed method or steps thereof. Such a general purpose processor may be or include a computer system including an input device, a memory, and a processing subsystem that is programmed (and/or otherwise configured) to perform an embodiment of a disclosed method (or steps thereof) in response to data asserted thereto.

Some embodiments of a disclosed system may be implemented as a configurable (e.g., programmable) digital signal processor (DSP) that is configured (e.g., programmed and otherwise configured) to perform required processing on audio signal(s), including performance of an embodiment of a disclosed method. Alternatively, embodiments of a disclosed system (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including an embodiment of a disclosed method. Alternatively, elements of some embodiments of a disclosed system may be implemented as a general purpose processor or DSP configured (e.g., programmed) to perform an embodiment of a disclosed method, and the system also may include other elements (e.g., one or more loudspeakers and/or one or more microphones). A general purpose processor configured to perform an embodiment of a disclosed method may be coupled to an input device (e.g., a mouse and/or a keyboard), a memory, and in some examples to a display device.

Another aspect of the disclosure may be implemented in one or more non-transitory computer-readable media (for example, one or more RAMs, ROMs, discs or other tangible storage media) which store code for performing (e.g., coder executable to perform) any embodiment of a disclosed method or steps thereof.

While specific embodiments and applications of the disclosure have been described herein, it will be apparent to those of ordinary skill in the art that many variations on the embodiments and applications described herein are possible without departing from the scope of this disclosure.

Various aspects of the present invention may be appreciated from the following enumerated example embodiments (EEEs):

EEE 1. A method for estimating a user's location in an environment, the method comprising:

receiving output signals from each microphone of a plurality of microphones in the environment, each of the plurality of microphones residing in a microphone location of the environment, the output signals corresponding to a current utterance of a user;

determining multiple current acoustic features from the output signals of each microphone;

applying a classifier to the multiple current acoustic features, wherein applying the classifier involves applying a model trained on previously-determined acoustic features derived from a plurality of previous utterances made by the user in a plurality of user zones in the environment; and determining, based at least in part on output from the classifier, an estimate of the user zone in which the user is currently located.

EEE 2. The method of EEE 1, wherein at least one of the microphones is included in or configured for communication with a smart audio device.

EEE 3. The method of EEE 1, wherein the plurality of user zones comprises a plurality of predetermined user zones.

EEE 4. The method of EEE 1, wherein the estimate is determined without reference to geometric locations of the plurality of microphones.

EEE 5 The method of any one of EEEs 1-4, wherein the multiple current acoustic features are determined asynchronously.

EEE 6. The method of any one of EEEs 1-5, wherein the current utterance and the previous utterances comprise wakeword utterances.

EEE 7. The method of any one of EEEs 1-6, wherein a user zone is estimated as a class with maximum posterior probability.

EEE 8. The method of any one of EEEs 1-7, wherein the model is trained using training data that is labelled with user zones.

EEE 9. The method of any one of EEEs 1-7, wherein applying the classifier involves applying a model trained using unlabelled training data that is not labelled with user zones.

EEE 10. The method of any one of EEEs 1-9, wherein applying the classifier involves applying a Gaussian Mixture Model trained on one or more of normalized wakeword confidence, normalized mean received level, or maximum received level.

EEE 11. The method of any one of EEEs 6, 8, 9 or 10, wherein training of the model continues during a process of applying the classifier.

EEE 12. The method of EEE 11, wherein the training is based on explicit feedback from the user.

EEE 13. The method of EEE 11, wherein the training is based on implicit feedback to the success of beamforming or microphone selection based on an estimated user zone.

EEE 14. The method of EEE 13, wherein the implicit feedback includes a determination that a user has terminated the response of a voice assistant abnormally.

EEE 15. The method of EEE 13, wherein said implicit feedback includes a command recognizer returning a low-confidence result.

EEE 16. The method of EEE 13, wherein said implicit feedback includes a second-pass retrospective wakeword detector returning low confidence that the wakeword was spoken.

EEE 17. The method of any one of EEEs 1-16, wherein the user zones include one or more of a sink area, a food preparation area, a refrigerator area, a dining area, a couch area, a television area or a doorway area.

EEE 18. The method of any one of EEEs 1-17, further comprising selecting at least one speaker according to the estimated user zone and controlling the at least one speaker to provide sound to the estimated user zone.

EEE 19. The method of any one of EEEs 1-18, further comprising selecting at least one microphone according to the estimated user zone and providing signals output by the at least one microphone to a smart audio device.

EEE 20. The method of any one of EEEs 1-19, wherein a first microphone of the plurality of microphones samples audio data according to a first sample clock and a second microphone of the plurality of microphones samples audio data according to a second sample clock.

EEE 21. An apparatus configured to perform the method of any one of EEEs 1-20.

EEE 22. A system configured to perform the method of any one of EEEs 1-20.

EEE 23. One or more non-transitory media having software stored thereon, the software including instructions for controlling one or more devices to perform the method of any one of EEEs 1-20.

EEE 24. An apparatus, comprising:
an interface system configured for receiving output signals from each microphone of a plurality of microphones in an environment, each of the plurality of microphones residing in a microphone location of the environment, the output signals corresponding to a current utterance of a user; and
a control system configured for:
determining multiple current acoustic features from the output signals of each microphone;
applying a classifier to the multiple current acoustic features, wherein applying the classifier involves applying a model trained on previously-determined acoustic features derived from a plurality of previous utterances made by the user in a plurality of user zones in the environment; and
determining, based at least in part on output from the classifier, an estimate of the user zone in which the user is currently located.

EEE 25. An apparatus, comprising:
an interface system configured for receiving output signals from each microphone of a plurality of microphones in an environment, each of the plurality of microphones residing in a microphone location of the environment, the output signals corresponding to a current utterance of a user; and
control means for:
determining multiple current acoustic features from the output signals of each microphone;
applying a classifier to the multiple current acoustic features, wherein applying the classifier involves applying a model trained on previously-determined acoustic features derived from a plurality of previous utterances made by the user in a plurality of user zones in the environment; and
determining, based at least in part on output from the classifier, an estimate of the user zone in which the user is currently located.

EEE 26. A training method, comprising:
prompting a user to make at least one training utterance in each of a plurality of locations within a first user zone of an environment;
receiving first output signals from each of a plurality of microphones in the environment, each of the plurality of microphones residing in a microphone location of the environment, the first output signals corresponding to instances of detected training utterances received from the first user zone;
determining first acoustic features from each of the first output signals; and
training a classifier model to make correlations between the first user zone and the first acoustic features, wherein the classifier model is trained without reference to geometric locations of the plurality of microphones.

EEE 27. The training method of EEE 26, wherein the training utterance comprises a wakeword utterance.

EEE 28. The training method of EEE 27, wherein the first acoustic features comprise one or more of normalized wakeword confidence, normalized mean received level or maximum received level.

EEE 29. The training method of any one of EEEs 26-28, further comprising:
prompting a user to make the training utterance in each of a plurality of locations within second through $K^{th}$ user zones of the environment;
receiving second through $H^{th}$ output signals from each of a plurality of microphones in the environment, the second through $H^{th}$ output signals corresponding to instances of detected training utterances received from the second through $K^{th}$ user zones, respectively;
determining second through $G^{th}$ acoustic features from each of the second through $H^{th}$ output signals; and
training the classifier model to make correlations between the second through $K^{th}$ user zones and the second through $G^{th}$ acoustic features, respectively.

EEE 30. The method of any one of EEEs 26-29, wherein a first microphone of the plurality of microphones samples audio data according to a first sample clock and a second microphone of the plurality of microphones samples audio data according to a second sample clock.

EEE 31. A system configured to perform the method of any one of EEEs 26-30.

EEE 32. An apparatus configured to perform the method of any one of EEEs 26-30.

EEE 33. An apparatus, comprising:
means for prompting a user to make at least one training utterance in each of a plurality of locations within a first user zone of an environment;
means for receiving first output signals from each of a plurality of microphones in the environment, each of the plurality of microphones residing in a microphone location of the environment, the first output signals corresponding to instances of detected training utterances received from the first user zone;
means for determining first acoustic features from each of the first output signals; and
means for training a classifier model to make correlations between the first user zone and the first acoustic features, wherein the classifier model is trained without reference to geometric locations of the plurality of microphones.

EEE 34. An apparatus, comprising:
a user interface system comprising at least one of a display or a speaker; and a control system configured for:
controlling the user interface system for prompting a user to make at least one training utterance in each of a plurality of locations within a first user zone of an environment;
receiving first output signals from each of a plurality of microphones in the environment, each of the plurality of microphones residing in a microphone location of the environment, the first output signals corresponding to instances of detected training utterances received from the first user zone;
determining first acoustic features from each of the first output signals; and
training a classifier model to make correlations between the first user zone and the first acoustic features, wherein the classifier model is trained without reference to geometric locations of the plurality of microphones.

The invention claimed is:

1. A computer-implemented method for estimating a user's location in an environment, the method comprising:
receiving output signals from each microphone of a plurality of microphones in the environment, at least two microphones of the plurality of microphones being included in separate devices at separate locations in the environment, the output signals corresponding to a current utterance of a user;
determining multiple current acoustic features from the output signals of each microphone; and
applying a classifier to the multiple current acoustic features, wherein applying the classifier involves applying a model trained to correlate the plurality of user zones in the environment and the multiple acoustic features, on previously-determined acoustic features determined from the output signals of each microphone corresponding to a plurality of previous utterances made by the user in a plurality of user zones in the environment,
wherein the output of the classifier provides an estimate of the user zone in which the user is currently located,
wherein a first microphone of the plurality of microphones samples audio data according to a first sample clock and a second microphone of the plurality of microphones samples audio data according to a second sample clock, and
wherein the current utterance and the previous utterances each comprise an utterance of a same wakeword and the acoustic features include a wakeword duration metric.

2. The computer-implemented method of claim 1, wherein at least one of the plurality of microphones is included in or configured for communication with a smart audio device.

3. The computer-implemented method of claim 1, wherein the plurality of user zones comprises a plurality of predetermined user zones.

4. The computer-implemented method of claim 1, wherein the estimate is determined without reference to geometric locations of the plurality of microphones.

5. The computer-implemented method of claim 1, wherein the multiple current acoustic features are determined asynchronously.

6. The computer-implemented method of claim 1, wherein the classifier estimates a posterior probability for each user zone wherein the user zone in which the user is currently located is estimated as the user zone with maximum posterior probability.

7. The computer-implemented method of claim 1, wherein the model is trained using training data that is labelled with user zones.

8. The computer-implemented method of claim 1, wherein the model is trained using unlabelled training data that is not labelled with user zones.

9. The computer-implemented method of claim 1, wherein the acoustic features further include at least one received level metric, wherein the received level metric indicates a sound level detected by a microphone.

10. The computer-implemented method of claim 9, wherein the model is a Gaussian Mixture Model trained on one or more of normalized wakeword confidence, normalized mean received level, or maximum received level.

11. The computer-implemented method of claim 10, wherein the normalized mean received level includes a mean received level over a duration of the most confident wakeword and/or the maximum received level comprises a maximum received level over a duration of the most confident wakeword.

12. The computer-implemented method of claim 1, wherein training of the model continues during a process of applying the classifier.

13. The computer-implemented method of claim 12, wherein the training is based on explicit feedback from the user.

14. The computer-implemented method of claim 12, wherein the training is based on implicit feedback to the success of beamforming or microphone selection based on an estimated user zone.

15. The computer-implemented method of claim 14, wherein the implicit feedback includes at least one of:
a determination that a user has terminated the response of a voice assistant abnormally; or
a command recognizer returning a low-confidence result; or
a second-pass retrospective wakeword detector returning low confidence that the wakeword was spoken.

16. The computer-implemented method of claim 1, further comprising selecting at least one speaker according to the estimated user zone and controlling the at least one speaker to provide sound to the estimated user zone.

17. The computer-implemented method of claim 1, further comprising selecting at least one microphone according to the estimated user zone and providing signals output by the at least one microphone to a smart audio device.

18. An apparatus, comprising:
an interface system configured for receiving output signals from each microphone of a plurality of microphones in an environment, at least two microphones of the plurality of microphones being included in separate devices at separate locations in the environment, the output signals corresponding to a current utterance of a user; and
a control system configured for:
determining multiple current acoustic features from the output signals of each microphone;
applying a classifier to the multiple current acoustic features, wherein applying the classifier involves applying a model trained to correlate the plurality of user zones in the environment and the multiple acoustic features, on previously-determined acoustic features determined from the output signals of each microphone corresponding to a plurality of previous utterances made by the user in a plurality of user zones in the environment, wherein the output of the classifier provides an estimate of the user zone in which the user is currently located, wherein the classifier estimates a posterior probability for each user zone, wherein the user zone in which the user is currently located is estimated as the user zone with maximum posterior probability, and wherein the current utterance and the previous utterances each comprise an utterance of a same wakeword and the acoustic features include a wakeword duration metric.

19. A system configured to perform the method of claim 1.

20. One or more non-transitory media having software stored thereon, the software including instructions for controlling one or more devices to perform the method of claim 1.

* * * * *